United States Patent [19]
Kreiner

[11] 3,907,231
[45] Sept. 23, 1975

[54] PNEUMATIC CONVEYOR TUBE SYSTEM
[75] Inventor: Hans-Jürg Kreiner, Munich, Germany
[73] Assignee: Gesellschaft fur Strahlen- und Umweltforschung mbH, Munich, Neuherberg, Germany
[22] Filed: Oct. 22, 1974
[21] Appl. No.: 517,156

[30] Foreign Application Priority Data
Oct. 26, 1973 Germany............................ 2353683

[52] U.S. Cl. .................. 243/2; 243/19; 243/29; 243/34; 243/38; 243/39
[51] Int. Cl.² .......................................... B65G 51/04
[58] Field of Search ............................. 243/1–5, 19, 243/20, 23, 24, 25, 28, 29, 30, 31, 32, 33, 34, 35, 38, 39; 302/2 R

[56] References Cited
UNITED STATES PATENTS
3,178,178   4/1965   Zeutschel.................... 243/39 X
3,711,038   1/1973   Otteren........................ 243/38 X

*Primary Examiner*—Richard A. Schacher
*Assistant Examiner*—James L. Rowland
*Attorney, Agent, or Firm*—Spencer & Kaye

[57] ABSTRACT

A pneumatic conveyor tube system includes a conveyor tube extending from a specimen preparing station; a branch in the conveyor tube; a guide tube extending from the branch to a specimen evaluating station; a carrier capsule received in the conveyor tube for travel therein; a specimen support insertable into and removable from the carrier capsule; and pneumatic apparatus for effecting travel of the carrier capsule in the conveyor tube. The specimen support device is ejected by centrifugal forces from the carrier capsule (as the latter passes through the branch) and is hurled into the guide tube for travel to the specimen evaluating station.

29 Claims, 11 Drawing Figures

PNEUMATIC CONVEYOR TUBE SYSTEM

BACKGROUND OF THE INVENTION

This invention relates to a pneumatic conveyor tube system for the extremely rapid transportation of a specimen supporting device between a specimen preparing station and a specimen evaluating station. The specimen supporting device (for example, a specimen receptacle) is forwarded in a pneumatically driven carrier capsule travelling in a conveyor tube, first to the specimen preparing station (such as a nuclear reactor) and then, after preparing (for example, irradiating) the specimen, to a separating station which is disposed before the evaluating station. The conveyance must be effected without any damage to the travelling components.

In German Laid-Open Application (Offenlegungsschrift) No. 2,051,854 there is disclosed an apparatus for the transportation of an element by means of a pneumatically operated conveyor tube system from an activating station to an unlocking device and therefrom to a measuring device. The element is transported in a carrier capsule and is separated from the carrier capsule in the unlocking device which is associated with the measuring device. In this known system the element is constituted by specimens and flow monitors, both formed as stacked discs of different thicknesses. The unlocking device which is formed of an abutment secured to the conveyor tube system for tongue supports and an abutment release on the carrier capsule, is complemented by a separating device having a receiving funnel with a built-in, obliquely arranged dual rail bounding a slot and an opening at the lower end of the dual rail. The slot and the opening merge into shafts which lead to the measuring device constituting the measuring stations.

The known conveyor tube system is not adapted for an extremely rapid transportation of a specimen — which has, for example, radioactive fission products of very short lifetime such as $Sn^{132}$ — to the evaluating (measuring) station, because even under the most favorable conditions, the travelling time is in the order of several seconds.

SUMMARY OF THE INVENTION

It is an object of the invention to provide an improved pneumatic conveyor tube system with which the transportation of a specimen receptacle from an irradiating station (activating station) to an evaluating station may be effected in milliseconds even over larger distances (10 m and more), without damaging the specimen receptacle and without the necessity of providing a capsule material which satisfies exceedingly high requirements concerning rupture strength and flow properties, in view of the high speed and the inherent frictional heat.

These objects and others to become apparent as the specification progresses, are accomplished by the invention, according to which, briefly stated, the pneumatic conveyor tube system includes a conveyor tube extending from a specimen preparing station; a branch in the conveyor tube; a guide tube extending from the branch to a specimen evaluating station; a carrier capsule received in the conveyor tube for travel therein; a specimen support insertable into and removable from the carrier capsule; and pneumatic apparatus for effecting travel of the carrier capsule in the conveyor tube. The specimen support device is ejected by centrifugal forces from the carrier capsule (as the latter passes through the branch) and is hurled into the guide tube for travel to the specimen evaluating station.

BRIEF DESCRIPTION OF THE DRAWINGS

FIGS. 1a–1f illustrate the configurations of cross sections $Q_1$–$Q_6$, respectively, shown in FIG. 1.

DESCRIPTION OF THE PREFERRED EMBODIMENT

Figure 1:
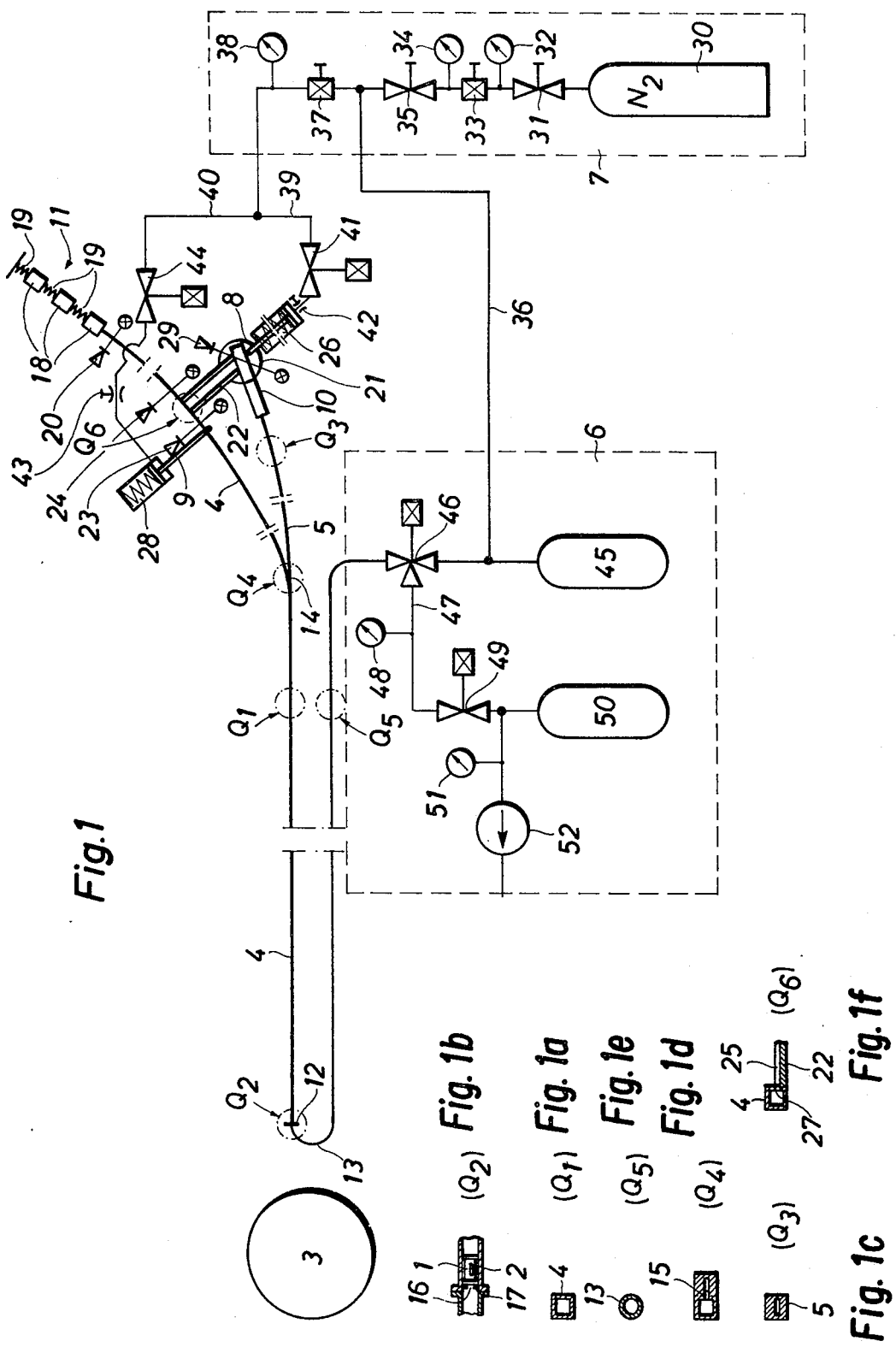
FIG. 1 is a schematic illustration of a system according to a preferred embodiment of the invention, showing the conveyor tube assembly in plan view.

In FIG. 1 there is schematically illustrated the overall structure of a pneumatic conveyor tube system utilized for moving a carrier capsule 1 with a specimen support means, such as a specimen receptacle 2 for irradiation in a specimen preparing station, such as a nuclear reactor 3. The course of the pneumatic conveyor tube assembly, formed of a conveyor tube 4 and a guide tube 5 is shown schematically and in top plan view. A pneumatic apparatus 6,7 for propelling the carrier capsule 1 accommodating the specimen receptacle 2 and for effecting the movements of a loading device 8, 26 to charge the carrier capsule 1 in the conveyor tube 4 with the specimen receptacle 2 situated in the measuring station, as well as for effecting the movements of an arresting device 9,28 is illustrated with the usual symbols. The braking device 10 for the specimen receptacle 2 is shown schematically; it is described later in more detail in conjunction with FIG. 4. The braking device 11 for the carrier capsule 1 is illustrated with its important components. The control of the entire system is illustrated in detail in FIG. 2.

Figure 3:
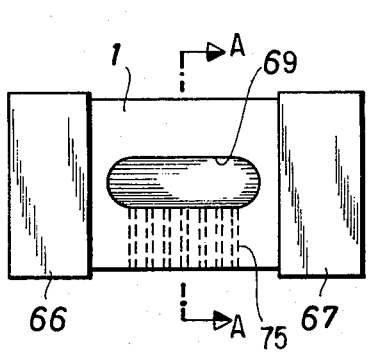
FIG. 3 is a schematic side elevational view of a carrier capsule forming part of the system according to the invention.

The conveyor tube 4 is an aluminum tube of square cross section $Q_1$ (FIG. 1a). The conveyor tube 4 has, at one of its ends, an abutment 12 and a coupling for attaching a feed tube 13. The coupling has a cross section $Q_2$ shown in FIG. 1b. At the other end of the conveyor tube 4 there is provided a braking device 11 for the carrier capsule 1. A defined portion of the conveyor tube 4 is arcuate and is provided with a branch 14 at the point of transition from the straight portion to the curved portion. A guide tube 5 for the specimen receptacle 2 is coupled to the conveyor tube 4 at the branch 14. The guide tube 5 may be straight or arcuate and has a rectangular cross section $Q_3$ (FIG. 1c) conforming to the cross-sectional outline of the specimen receptacle 2. The conveyor tube 4 and the guide tube 5 have, in the zone of the branch 14, a cross section $Q_4$, illustrated in FIG. 1d. As seen in this Figure, the two inner spaces communicate through a slot 15 which has, along the conveyor tube 4 and the guide tube 5, an enlarged portion sufficiently large to permit — under given speed conditions of the carrier capsule 1 and the specimen receptacle 2, as they arrive approximately at the speed of sound from the direction of the irradiating station 3 and for a given weight of the specimen receptacle as well as for given radii of curvature of the two tubes 4 and 5 before and after the switch 14 — that the specimen receptacle 2 is hurled, by virtue of contrifugal forces, from the carrier capsule 1 (for example, from an opening 69 as shown in FIG. 3) through the slot 15, into the guide tube 5 and up to the braking device 10. The conveyor tube 4 and the guide tube 5 may have an internal cross section other than rectangular (for example oval) or may be provided with guide strips or guide edges, dependent upon the cross-sectional outline of the carrier capsule 1 and the specimen receptacle 2, respectively. Care has to be taken, however, that the external cross section of the carrier capsule 1 and the inner cross section of the conveyor tube 4 be at all times coordinated with one another in such a manner that the relative angular position of the components 1 and 4 remains unchanged. The same applies to the relationship of the specimen receptacle 2 with regard to the internal cross section $Q_3$ (FIG. 1c) of the guide tube 5. Thus, the guide tube 5 is adapted to guide the specimen receptacle 2 in the travelling direction.

An abutment 12 determining the irradiating position of the carrier capsule 1 includes, in the simplest embodiment, a window 16 having a frame 17 which arrests the carrier capsule 1 (FIG. 1b).

A feed tube 13 for generating a vacuum in the conveyor tube 4 to transport the carrier capsule 1 to the abutment 12 or, as the case may be, for generating a compression wave to return the same rightward (as viewed in FIG. 1), may be of desired design. Preferably, it has a circular internal cross section $Q_5$ (FIG. 1e) and is connected with the pnuematic apparatus 6.

The braking device 11 has an energy impulse absorber which is formed of serially arranged masses 18 which have the dimension (or the weight) of the carrier capsule 1 and between which there are arranged rubber bumpers constituting a shock absorber 19. By means of the shock absorber 19 the speed of the carrier capsule 1 is reduced to zero by energy absorption without damage. By virtue of the elasticity of the shock absorber 19, the position of rest of the carrier capsule 1 behind a light barrier 20 is reliably predetermined.

Figure 4:
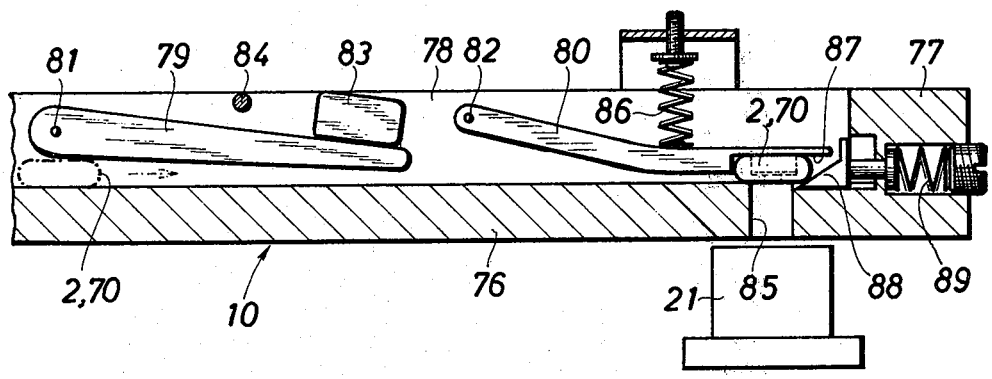
FIG. 4 is a longitudinal sectional view of a braking device which serves for the deceleration of a specimen receptacle and which forms part of the system according to the invention.

The braking device 10 which serves for arresting the specimen receptacle 2 and which will be described in more detail in conjunction with FIG. 4, is situated in the zone of a detector 21. The latter senses fission fragments and/or radiation from the specimen situated in the specimen receptacle 2, or which measures the radiation intensity and the intensity drop. The braking device 10 is, as seen in FIG. 1, connected through a charging ramp 22 with the conveyor tube 4 in the zone of two light barriers 23,24 for positioning the carrier capsule 1 to receive the specimen receptacle 2.

The loading ramp 22 is constituted by a simple web having a groove-like cutout 25 (FIG. 1f), the width of which corresponds to that of the specimen receptacle 2. The loading ramp 22 is used only in case the specimen receptacle 2 is to be reused with the same specimen. In such a case the evaluated specimen receptacle 2 is pushed by the loading piston 26 operated by the pneumatic device 7, through a lateral slot (the height and width of which correspond to the dimensions of the specimen receptacle 2) onto the loading ramp 22 and is therefrom pushed into the carrier capsule 1 through a further lateral slot 27 (which corresponds to the lateral slot in the guide tube 5 and which is shown in FIG. 1f.). At this time the carrier capsule 1 dwells in its position of rest between the light barriers 23 and 24 at the abutment piston 9, which may also be pneumatically driven by the apparatus 7. Subsequent to the loading step and after the pistons 8,9 are returned to their respective position of rest, the carrier capsule 1 is ready for travel to the irradiating station 3. A further light barrier 29 serves for determining the position of the specimen receptacle 2 in the measuring station. All the light barriers 20,23,24 and 29 may be connected through optical conductors (not shown in detail) with the measuring and transporting control apparatus (FIG. 2) for a rapid transmission of a light pulse.

The pneumatic apparatus 6 and 7 serves, on the one hand, for the control of the piston assemblies 8,26 and 9,28 and, on the other hand, for the generation of vacuum and, as the case may be, high pressure in the feed tube 13 and the conveyor tube 4. The cylinders 26,28 are supplied with pneumatic pressure which is supplied by the compression gas container 30 (containing, for example, $N_2$ gas) and which is controlled by an arrangement including a shutoff valve 31, a pressure gauge 32 indicating the container pressure, a pressure reducer 33, a launching pressure gauge 34, a shutoff valve 35, a pressure reducer 37, an operational pressure gauge 38 and branch conduits 39 and 40. The piston cylinder 26 is connected through an operating valve 41 and a throttle 42 with the branch conduit 39, while the piston cylinder 28 is coupled through a throttle 43 and an additional operating valve 44 with the branch conduit 40. The return of the pistons 8 and 9 is effected by means of spring force or, in the alternative, by virtue of their reverse pressurization. The pistons 8 and 9 may be introduced into and withdrawn from the lateral walls of the tubes 4 and 5, respectively, through openings (not shown) provided therein.

The pneumatic device 6 comprises a pressure vessel 45 which is directly connected with a pressure conduit 36 and a three-way solenoid valve 46 which, in turn, is also coupled to the feed tube 13 and a vacuum conduit 47. The latter is connected withh a vacuum gauge 48, a vacuum intake valve 49 and a vacuum vessel 50. The latter is connected by means of an additional vacuum gauge 51 to a vacuum pump 52. The pressure conduit 36, by virtue of its connection to one part of the three-Way valve 46, couples the components 30 to 35 of the device 7 to the device 6.

For generating a controlled vacuum in the feed tube 13 and the conveyor tube 4 by means of the device 6, the valve 46 is placed in a position in which it shuts off the conduit 36 and the pressure vessel 45 from the tube 13. At the same time, the valve 49 is opened. This vacuum draws the carrier capsule 1 into the loading position between the light barriers 23,24 and thereafter (that is, after positioning the specimen receptacle 2 in the carrier capsule 1), to the irradiating station 3.

For the extremely rapid reverse conveyance (that is, for a travel towards the right from the abutment 12 as viewed in FIG. 1) of the carrier capsule 1 with the specimen receptacle 2 at the speed of sound (approximately 340 m/sec), the vacuum supply is shut off by closing the valve 49, and the valve 46 is set into a position in which it connects the pressure conduit 36 with the feed tube 13 and thus with the conveyor tube 4. This setting of the valve 46 is effected very rapidly by a high voltage-controlled, transistorized circuit by means of a short-period overload (approximately 330-fold). The pulse generator 62 forms a timing signal of 1—10 ms and defines the timing of valve 46. The high voltage device 63 then amplifies this timing signal up to 350 V. By virtue of this extremely rapid opening of the valve 46 there is generated, at a pressure of approximately 3 atmosphere gauge, a compression wave which is sufficient to shoot back the carrier capsule 1 to the braking device 11 and the specimen receptacle 2 to the measuring station 10,21 in milliseconds for a travelling length of 5–10 meters. The pressure vessel 45 effects a sufficient resupply of the transporting gas which generates the compression wave. For an improved, practically friction-free guidance, the carrier capsule 1 does not engage snugly the lateral walls of the conveyor tube 4.

Subsequently, the valve 46 is again switched to couple the vacuum source to the tubes 13 and 4 (in the meantime, the vacuum pump 52 has already evacuated the vessel 50), whereby pressure in tubes 13 and 4 is reduced. As a result, the carrier capsule 1 (which was charged in the meantime with a specimen receptacle 2) is, for repeating the irradiation process, drawn again to the irradiating station 3.

Figure 2:
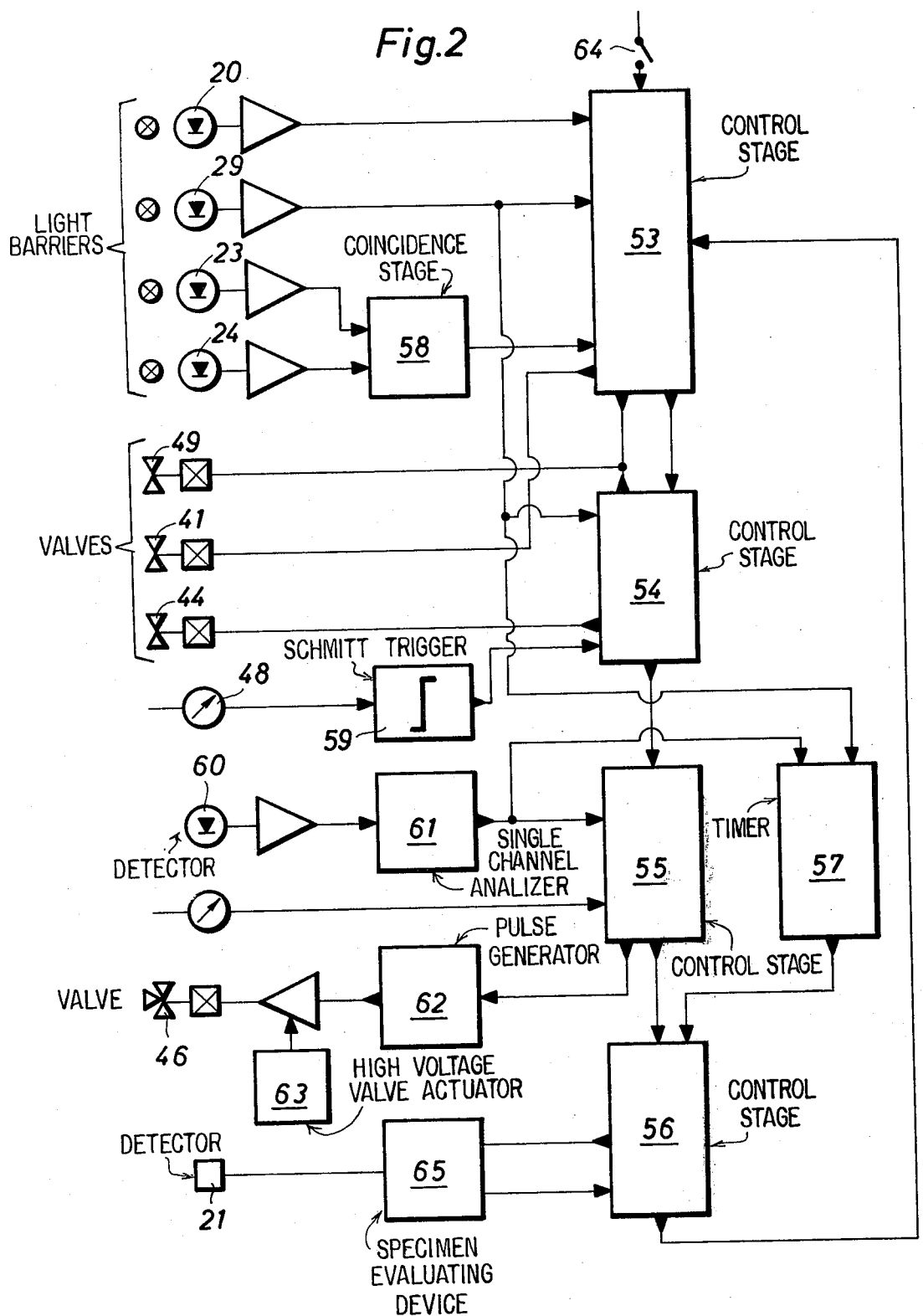
FIG. 2 illustrates a block diagram of a control apparatus for the pneumatic conveyor tube system of FIG. 1.

The control apparatus for effecting all the operations of the pneumatic tube conveyor system is illustrated in a block diagram form in FIG. 2. The control apparatus essentially comprises four control stages 53,54,55 and 56, a timer 57 and accessory equipment. The control stage 53 serves as the control station for the initial positioning of the carrier capsule 1 and the specimen receptacle 2 and therefore receives signals from the light barriers 20 and 29. The control stage 53 further serves for controlling the advance of the carrier capsule 1 to the loading station between the two light barriers 23 and 24 and its charging with specimen receptacle 2. As it may be observed in FIG. 1, the light barrier 29 is connected with the loading station between the two light barriers 23 and 24. The light barrier 29 is also connected with the control stage 54 and with the timer 57. The light barriers 23 and 24 apply signals to a coincidence stage 58 which, when it responds, emits a pulse to the control stage 53 to indicate the assumption of the loading position by the carrier capsule 1. The control stage 53 then actuates the operating valve 41 of the loading piston 8 which thus introduces the specimen receptacle 2 into the carrier capsule 1. The termination of the loading step is signalled by means of an abutment switch (not shown). During the loading process, the arresting piston 9 is not yet operated by the valve 44, so that the carrier capsule 1 is maintained immobilized at the discharge end of the ramp 22. The transport of the carrier capsule 1 to the loading position is effected by briefly opening the valve 49 (and establishing communication between tube 13 and conduit 47 by means of the valve 46) to thus generate a vacuum which draws the carrier capsule 1 from the braking device 11 (light barrier 20) into the loading position (light barriers 23 and 24). The normal position of the arresting piston 9 is its locking position.

Upon completion of the loading step, the control stage 54 controlling the position of the carrier capsule 1 and the specimen receptacle 2 in the irradiating station 3 is actuated. Simultaneously, the valve 49 for a further generation and readying of the vacuum is also actuated. After the valve 44 has been opened in the branch conduit 40 by the control stage 54 for withdrawing the piston 9, the carrier capsule 1 (with the specimen receptacle 2 positioned therein), is drawn by vacuum into the irradiating station 3 to the abutment 12. The arrival of the carrier capsule 1 to the abutment 12 is signalled by the vacuum gauge 48, since this occurrence causes an abrupt change and stabilization of the vacuum in the tube 13 and the conduit 47. The gauge 48 thus emits a signal to the control stage 54 through a Schmitt trigger 59. Simultaneously, the light barrier 29 signals, for safety reasons, that the specimen receptacle 2 also has left its measuring position 21 and is now situated in the carrier capsule 1.

As soon as the treatment of the specimen is completed at the irradiating station 3, the control stage 54 emits a signal to the control stage 55 for preparing and returning the carrier capsule 1 and the specimen receptacle 2 into the terminal position 20 and the measuring position 21, respectively. The return launch occurs when the gauge 34 indicates that in the pressure conduit 36 there prevails a sufficiently high advance pressure and when a detector 60, responsive to the Cerenkov radiation or the like occurring in the nuclear reactor during irradiation, indicates such radiation thus signalizing that the irradiation of the specimen receptacle 2 has been completed. The detector 60 thus emits a signal through a single-channel analyzer 61 to the control stage 55 and to the timer 57 which starts to count upon receipt of the signal. Almost simultaneously with the receipt of this signal (in a time, defined by the moment of opening of valve 46 and incoming at the measuring station 10, 21 being longer than the travelling or transporting time), the high voltage-operated return launch valve 46 is actuated by the high-voltage device 63 by means of a pulse generator 62. Thus, the valve 46 opens for releasing the compression wave. The compression wave propels the carrier capsule 1 and the specimen receptacle 2 to their initial positions at 11 and 10, respectively. The duration of this travel is measured by the timer 57. The latter is stopped when the specimen receptacle 2, which is ejected from the carrier capsule 1 into the guide tube 5 in the zone of the branch 14, reaches the measuring position 21 and actuates the light barrier 29. In case the specimen receptacle 2 does not reach the light barrier 29, the timer 57 passes a limit value, whereupon the electronic measuring device 65 connected with the detector 21 is stopped. The electronic measuring device 65 is triggered by the control stage 56 by means of a signal from the timer 57 when the latter has measured a time period which is smaller than the predetermined limit value. The electronic measuring device including a multichannel analyzer connected to the detector 21 for examining the shortlife fission products from the specimen receptacle 2, measures intensity values (energy, intensity, etc.) and runs through a predeterminable time period. Subsequently, the device 65 emits a signal to the control stage 56 which triggers a repetition of the entire process: the control stage 53 receives an actuating signal unless the timer 57 blocks a recurrence altogether. The entire control apparatus is first energized by connecting it through a starting key 64 with an energy source, now shown. The operational steps are repeatable for a desired number of times. The control stages 53–56 are of the form of a processing computer of usual design.

Figure 3A:
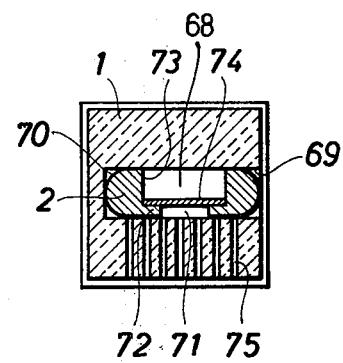
FIG. 3a is a sectional view taken along line A—A of FIG. 3.

Turning now to FIGS. 3 and 3a, there is shown a carrier capsule 1 in a side elevational and cross-sectional view, respectively. In FIG. 3a there is seen the specimen receptacle 2 situated within the carrier capsule 1. The carrier capsule 1 essentially comprises a cubical or wafer-shaped body which may have terminal enlargements 66 and 67. The cross-sectional outline of the carrier capsule 1 is a slightly smaller than the internal cross section $Q_1$ of the conveyor tube 4 to ensure a better positioning and guidance. The carrier capsule 1 further has a cavity 68 with a lateral outlet opening 69 so positioned that it is in registry with the slot 15 at the branch 14 when the carrier capsule 1 is in the process of passing through the branch 14. It is to be understood that the carrier capsule 1 has to be first inserted into the conveyor tube 4 with the proper lateral orientation. The guidance of the carrier capsule 1 is effected in such a manner by the inner configuration of the conveyor tube 4 that its position with respect to the tube cross section $Q_1$ is not changed during the rapid reverse travel from the irradiating station 3. The body of the carrier capsule 1 may be made of a polyamide or of a material which survives without damage the deceleration effected by the braking device 11.

Within the cavity 68 of the carrier capsule 1 there is situated the specimen receptacle 2 during the transportation to the irradiating station 3 and during return travel up to the branch 14. The loading of the specimen receptacle 2 into and its ejection from the carrier capsule 1 are effected through the opening 69. The ejection occurs by virtue of centrifugal forces acting on the mass inertia of the specimen receptacle 2 as the carrier capsule 1 changes direction in the branch 14 by virtue of a more or less sharp curve of the conveyor tube 4. Thus, the specimen receptacle 2 will continue its travel in the guide tube 5 which, at least in the zone of the branch 14, is oriented in the same direction as the guide tube 4 before the branch 14. The travel of the specimen receptacle 2 subsequent to its separation from the carrier capsule 1 occurs in a flutter-free manner and without the danger of damage, since the internal cross section $Q_3$ of the guide tube 5 is adapted to the height and width of the specimen receptacle 2.

The carrier capsule 1 may be provided with parallel bore holes 75 which lead from the outside of the carrier capsule 1 to the cavity 68 and which may serve as a collimator for the radiation effected in the irradiating station 3.

Referring once again to FIG. 3a, the specimen receptacle 2 is essentially formed of a ring-shaped body 70 which has somewhat rounded lateral edges and a floor 72 which is provided with a bore hole 71. In this manner a cavity 73 is formed in the ring 70. To the inner side of the floor 72 there is secured a thin foil 74 made of low-pressure polyethylene, polyamide or other similar material. The foil 74 constitutes the specimen support proper and is protected against wind and travel pressures. On this foil there may be applied substances which undergo radioactive fission under the effect of irradiation or to which there are applied radionuclides during irradiation. The ring 70 may be made of the same material as the foil 74.

Turning now to FIG. 4, there is illustrated a braking device 10 for decelerating the specimen receptacle 2 and for positioning it in the measuring station 21. The device 10 brakes the specimen receptacle 2 in a flutter-free manner and arrests the same in the measuring position without damage. It is made, for purposes of better adhesion with the ring 70, of a polyamide or of the same material as the ring 70. On a base plate 76, having a terminal abutment plate 77 and lateral guides 78 (of which only the rear one is visible), there are arranged two serially connected brake shoes 79 and 80 which are movable about rotary axes 81 and 82, respectively. The upstream or first brake shoe 79 has a wedge shaped configuration; at its free end it is loaded with a braking weight 83. By means of the braking weight 83, the ring 70 which arrives at a great speed from the branch 14 and the upper face of which is exposed to the force of the brake shoe 79, is braked from a wide speed range to an almost always identical residual speed value. Stated differently, the braking force applied by the brake shoe 79 is substantially proportional to the speed of the incoming specimen receptacle 2. An abutment 84 disposed over the brake shoe 79 serves to prevent the brake shoe 79 from being swung around by the incoming ring 70 but is caused to rebound into its initial position onto the base plate 76 by its own weight. The weight 83 is adapted to the principal velocities of the ring 70 and to the braking forces required therefor.

The residual braking and positioning of the ring 70 above an opening 85 oriented towards a detector 21 (such as a sodium iodine scintillator or Ge(Li) detector or the like) is effected by means of a downstream or second brake shoe 80. The latter is biased by the force of a spring 86 and has at its free end a recess 87 which serves for receiving the ring 70 in the evaluating (measuring) position. The ring 70 is pressed into the recess 87 by a wedge-shaped abutment 88. The latter is elastically supported in the abutment face 77 by means of a spring 89. The abutment 88 absorbs the residual energy of the incoming ring 70 and subsequently pushed the same back into the measuring position. The function of the two brake shoes 78 and 90 may be performed in some cases by a single brake shoe.

It will be understood that the above description of the present invention is susceptible to various modifications, changes and adaptations, and the same are intended to be comprehended within the meaning and range of equivalents of the appended claims.

I claim:

1. In a pneumatic conveyor tube system including tube means extending from a specimen preparing station to a specimen evaluating station; a carrier capsule arranged for travel in the tube means; pneumatic means for effecting travel of the carrier capsule in the tube means; a specimen support means supporting the specimen and receivable in the carrier capsule; the improvement comprising in combination:
   a. a conveyor tube extending from said specimen preparing station; said conveyor tube including orienting means for maintaining the angular position of said carrier capsule unchanged within and with respect to said conveyor tube;
   b. a branch means in said conveyor tube at a location spaced from said specimen preparing station and said specimen evaluating station;
   c. a guide tube extending from said conveyor tube at said branch means and leading to said specimen evaluating station, said conveyor tube, said branch means and said guide tube constituting said tube means; and
   d. means effecting a separation by centrifugal forces of said specimen support means from said carrier capsule in said branch means for ejecting said specimen support means from said carrier capsule into said guide tube as said carrier capsule passes through said branch means during its travel from said specimen preparing station and for propelling said specimen support means in said guide tube into said specimen evaluating station by the kinetic energy transmitted to said specimen support means by said carrier capsule.

2. A system as defined in claim 1, wherein said orienting means includes a rectangular passage cross section of said conveyor tube.

3. A system as defined in claim 2, wherein said cross section is square.

4. A system as defined in claim 1, wherein said orienting means includes guide means within and along said conveyor tube for cooperating with said carrier capsule.

5. A system as defined in claim 4, wherein said guide means are the inner side walls of tube 4.

6. A system as defined in claim 1, wherein said conveyor tube includes an arcuate portion at least in the zone of said branch means for effecting an ejection of said specimen support means from said carrier capsule into said guide tube, said arcuate portion forming part of said means effecting a separation.

7. A system as defined in claim 6, said conveyor tube having a portion beyond said branch means, said portion diviating from said guide tube.

8. A system as defined in claim 1, wherein said carrier capsule includes means defining a cavity for receiving said specimen support means; and means defining a lateral opening in said carrier capsule, said lateral opening communicating with said cavity for introduction and removal of said specimen support means into and from said cavity, respectively, said lateral opening forming part of said means effecting a separation.

9. A system as defined in claim 8, wherein said orienting means effects a registry between said lateral opening and said guide tube as said carrier capsule passes through said branch means.

10. A system as defined in claim 1, wherein said guide tube has a passage cross section for guiding said specimen support means parallel to its direction of travel.

11. A system as defined in claim 1, including a brake means connected to said guide tube for decelerating said specimen support means and positioning it in said specimen evaluating station.

12. A system as defined in claim 11, wherein said brake means includes brake shoe means for exerting on said specimen support means a braking force that is proportional to the speed of said specimen support means.

13. A system as defined in claim 12, wherein said brake shoe means is made of a polyamide.

14. A system as defined in claim 11, said brake means including a brake shoe; means defining a recess in said brake shoe for accommodating at least one portion of said specimen support means; said recess being aligned with said specimen evaluating station; and a spring-biased abutment member cooperating with said recess, said abutment member being positioned at the end of the travelling path of said specimen support means for positioning the latter in said recess.

15. A system as defined in claim 1, wherein said carrier capsule is made of a polyamide.

16. A system as defined in claim 1, wherein said specimen support means comprises a ring-shaped body; means defining a cavity in said ring-shaped body and a specimen-carrying foil disposed in said cavity and secured to said body.

17. A system as defined in claim 16, wherein said foil is made of a low-pressure polyethylene.

18. A system as defined in claim 1, including means for generating a vacuum in said conveyor tube for moving said carrier capsule into said specimen preparing station; and means for generating a compression wave in said conveyor tube for rapidly moving said carrier capsule from said specimen evaluating station in said conveyor tube towards and past said branch.

19. A system as defined in claim 18, said means for generating said compression wave includes a gas pressure source; a solenoid valve connecting said gas pressure source to said conveyor tube; and means for a high-voltage control of said solenoid valve for a rapid opening of the latter.

20. A system as defined in claim 19, wherein said solenoid valve is a three-way valve; the improvement further comprising a vacuum source connected to said three-way valve, said three-way valve having a position in which said vacuum source is connected to said conveyor tube; said vacuum source and said three-way valve forming part of said means for generating a vacuum.

21. A system as defined in claim 1, including an abutment in said conveyor tube at said specimen preparing station for determining the position of said carrier capsule in said specimen preparing station.

22. A system as defined in claim 1, said conveyor tube having a portion beyond said branch means; the improvement further comprising a brake means for decelerating said carrier capsule as it arrives from said specimen preparing station.

23. A system as defined in claim 1, including a light barrier situated at said specimen evaluating station for emitting a signal when said specimen support means assumes its position in said specimen evaluating station.

24. A system as defined in claim 1, further comprising a loading device for charging said carrier capsule with said specimen support means while said carrier capsule is stationary in a loading position in said conveyor tube.

25. A system as defined in claim 24, said conveyor tube having a portion beyond said branch means, said loading device being situated adjacent said portion of said conveyor tube.

26. A system as defined in claim 25, wherein said loading device includes a power cylinder; a loading piston movably held in said power cylinder for charging said carrier capsule with a specimen support means through a lateral opening in said conveyor tube; and means for energizing said power cylinder.

27. A system as defined in claim 26, said loading device further including a ramp leading from said specimen evaluating station to said lateral opening in said conveyor tube, said loading piston pushing said specimen support means from said specimen evaluating station along said ramp through said lateral opening into said carrier capsule.

28. A system as defined in claim 24, including light barrier means in said conveyor tube in the zone of said loading device for determining a loading position of said carrier capsule.

29. A system as defined in claim 24, including a control apparatus for controlling the movement of said carrier capsule and said specimen support means in said tube means, said control apparatus comprising:
   a. first control means connected to said loading device for actuating the latter after said carrier capsule has assumed its loading position;
   b. second control means connected to said pneumatic means for actuating the latter to move said carrier capsule from said loading position to said specimen preparing station after said carrier capsule has been charged with said specimen support means by said loading device;
   c. third control means connected to said pneumatic means for actuating the latter to rapidly move said carrier capsule from said specimen preparing station towards and past said branch means upon receipt of a signal by said third control means indicating the completion of specimen preparation in said specimen preparing station;
   d. timer means;
   e. means applying signals to said timer means at the beginning of the travel of said carrier capsule from said specimen preparing station and at the arrival of said specimen support means in said specimen evaluating station for measuring the time elapsed; and
   f. fourth control means connected to said specimen evaluating station for effecting the start of measuring upon arrival of said specimen support means in said specimen evaluating station, said fourth control means being further connected to said first control means for actuating the latter to repeat an operational cycle.

\* \* \* \* \*